United States Patent Office 3,833,532
Patented Sept. 3, 1974

3,833,532
LATEX PREPARATION
Donald Alfred Bennett, Brockenhurst, and Edward William Duck, Southampton, England, assignors to The International Synthetic Rubber Company Limited, Hampshire, England
Filed May 5, 1972, Ser. No. 250,745
Claims priority, application Great Britain, May 13, 1971, 14,626/71
Int. Cl. C08d 3/02; C08f 3/42, 3/62
U.S. Cl. 260—29.7 SQ
28 Claims

ABSTRACT OF THE DISCLOSURE

A process for the preparation of rubbery polybutadiene latex of large particle size especially suitable for use in grafting reactions, as in the preparation of ABS, comprises (1) emulsifying butadiene with 0.5 to 1.5 parts by weight per hundred parts of butadiene of an anionic emulsifier and in addition a thermally decomposable free radical initiator,
(2) initiating polymerization and allowing polymerization to proceed under conditions such that the temperature of the reaction mixture is in excess of 85° C. for at least part of the reaction, and
(3) recovering the latex.

Figure 1:
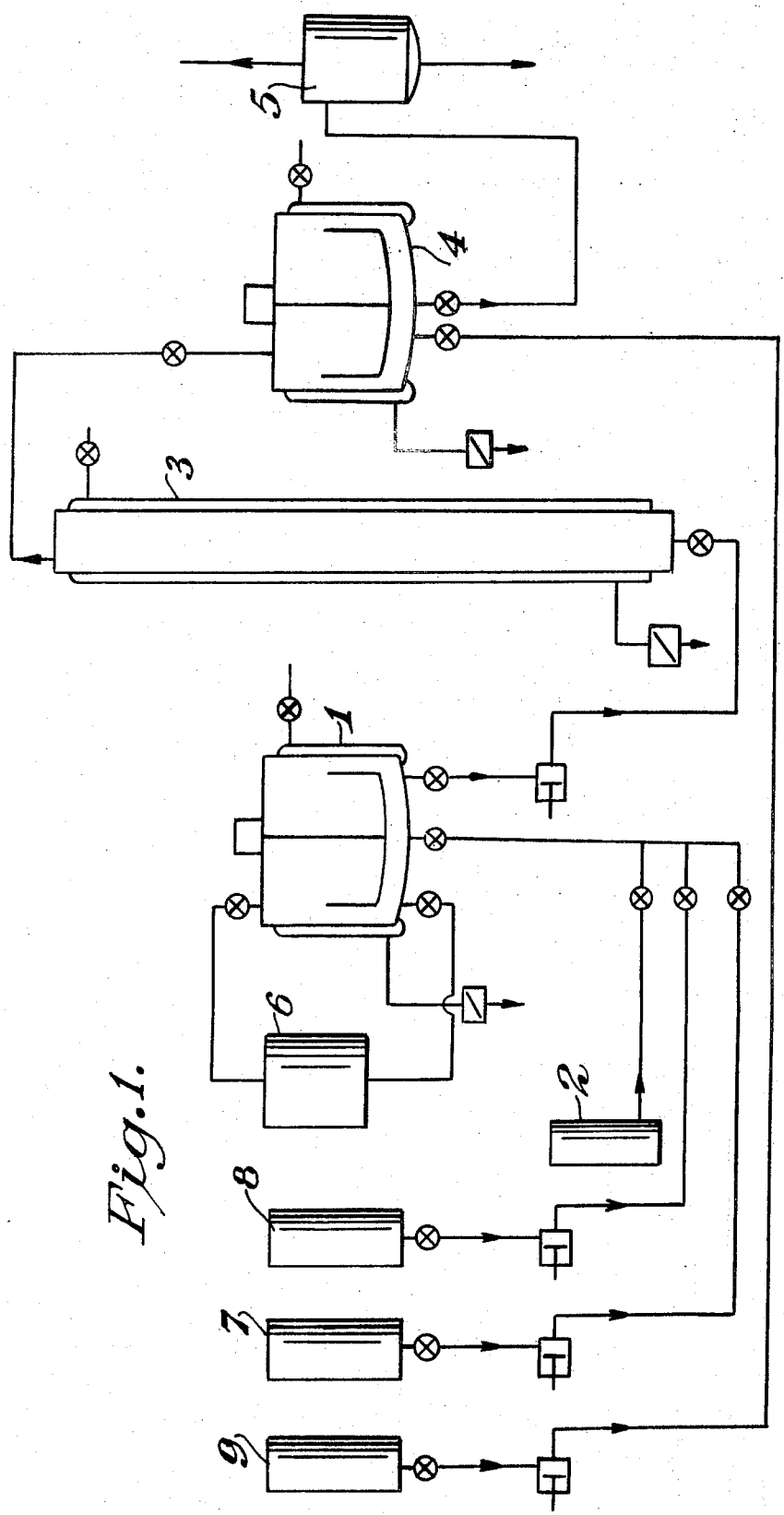

The process is advantageously used for a continuous flow polymerization in a stirred pressure vessel at a temperature not exceeding 100° C. using a mixed anionic emulsifier system and a persulphate initiator.

---

This invention relates to the preparation of a polybutadiene latex and, in particular, to the preparation of a polybutadiene latex which is suitable for the preparation of acrylonitrile/butadiene/styrene graft copolymers (ABS).

Polybutadiene latices are commonly prepared by emulsion polymerization techniques employing comparatively low temperatures (e.g. 5° to 50° C.), and emulsifier concentrations of about 3.5 to 5 parts by weight per hundred parts of butadiene monomer. Conversions of monomer to polymer of about 70% are obtained in about 20 hours or more. In such cases the number average particle diameter of the latex particles does not exceed about 1000 A. A latex having a particle size of this order is not suitable for many applications, including the preparation of ABS graft copolymers, which require a latex having a large number average particle diameter of e.g. at least 1500 A., and a weight average particle diameter of at least 2500 A.

It is well known that a decrease in the amount of emulsifier in an emulsion polymerization increases the average particle size of the latex particles. Furthermore it is well known that an increase in the temperature of an emulsion polymerization causes a decrease in the average particle size of the latex particles. Accordingly, in order to obtain the required large number average particle diameter, it is usual to employ lower emulsifier concentrations whilst retaining the aforementioned polymerization temperatures. However as a consequence, long polymerization times are required, e.g. a concentration of less than 3.5 parts by weight of emulsifier per hundred parts of butadiene requires a reaction time of e.g. 70 hours, and the stability of the latex is poor.

It is a main object of the present invention to provide a process for the preparation of a polybutadiene latex of number average particle diameter of at least 1500 A. in a relatively short time.

We have now found it possible to prepare such a polybutadiene latex in a few hours (e.g. 3 to 8 hours) by polymerization of butadiene at higher temperatures than used heretofore. Contrary to previous practice in the polymerization of butadiene, the temperature of the reaction mixture is in excess of 85° C. for at least a part, and generally for a substantial part, of the reaction.

According to the present invention a process for the preparation of a rubbery polybutadiene latex having particles of number average particle diameter ($\bar{D}n$) of at least 1500 A. and of weight average particle diameter ($\bar{D}w$) of at least 2500 A. comprises:

(1) preparing an aqueous emulsion of butadiene containing 0.5 to 1.5 parts by weight of an anionic emulsifier per hundred parts of butadiene and in addition a thermally-decomposable free radical initiator,
(2) initiating polymerization and allowing polymerization to proceed under conditions such that the temperature of the reaction mixture is in excess of 85° C. for at least a part of the reaction, and
(3) recovering the latex.

By the use of the process of the present invention, a stable polybutadiene latex of the stated particle size is obtained much more quickly and more economically than has been obtained heretofore. The process is particularly useful for the preparation of a polybutadiene latex for use in the preparation of ABS.

Preferably the polymerization reaction is carried out under continuous flow conditions, and preferably such that at least a proportion of the heat of polymerization is retained in the reaction mixture.

The anionic emulsifier used in the process of the invention may be an alkali metal salt, e.g. a sodium or potassium salt, of a long chain organic carboxylic acid (e.g. having twelve to twenty or more carbon atoms), or of rosin acid. Especially suitable salts are salts of saturated fatty acids having 16 to 20 carbon atoms, and in particular salts of palmitic acid (C16) and stearic acid (C18), and salts of unsaturated fatty acids having 16 to 18 carbon atoms such as oleic acid, or a mixture of such salts. Potassium oleate is very effective and, if desired, it may be prepared in situ using oleic acid and. e.g. potassium hydroxide and/or potassium carbonate. Anionic emulsifiers, such as those described above, are good soaps and are good micelle formers, and they are referred to herein as primary emulsifiers.

It is particularly preferred to use as the anionic emulsifier a mixture of a primary emulsifier (as just defined) and a secondary emulsifier. A secondary emulsifier is one which is a poor soap and is poor at forming micelles, but which is, however, a good stabiliser for the micelles, once formed. An example of such a secondary emulsifier is an alkali metal salt of a naphthalene-sulphonic acid derivative such as the sodium salt of naphthalene-sulphonic acid-formaldehyde condensate. Such secondary emulsifiers are available commercially under the Trade Names, Dispersol, Bevaloid and Daxad.

The total amount of anionic emulsifier (including any secondary emulsifier) is 0.5 to 1.5 parts by weight per hundred parts of butadiene monomer (0.5 to 1.5 phm.), preferably 0.6 to 1.0 phm. The secondary emulsifier, if present, is generally used in amounts of e.g. 0.3 to 1.0 phm. It is particularly advantageous to use a combination of a primary emulsifier and secondary emulsifier in a weight ratio of 5:1 to 1:5. In the case of, for example, a fatty acid salt, e.g. potassium oleate, used with the sodium salt of naphthalene-sulphonic acid-formaldehyde condensate, the weight ratio is desirably 1:2 to 1:3.

As mentioned above, in the process of the present invention we employ a thermally-decomposable free radical initiator by which we mean an initiator which produces free radicals by thermal decomposition. Preferred initiators are those which have a short half-life. e.g. of less than 1 minute, at temperatures of 100° C. to 200° C. Examples of such initiators are organic peroxides such as $t$-butyl hydroperoxide, $t$-butyl peroctoate, benzoyl peroxide and dicumyl peroxide, and the sodium, potassium and ammonium salts of peroxydisulphate (persulphate). A particularly preferred initiator is one which is water-soluble but not oil-soluble such as potassium or ammonium persulphate. These have a very short half-life at temperatures in excess of 100° C. and hence decompose very rapidly. The amount of free radical initiator used is generally in the range of 0.1 to 0.40 phm.; 0.20 to 0.30 phm. of potassium or ammonium persulphate is very effective.

In common with known emulsion polymerization techniques, it is desirable to include a molecular weight modifier such as a mercaptan for example, $t$-dodecyl mercaptan, or $n$-dodecyl mercaptan in the reaction mixture, the amount of such modifier generally being from 0.03 to 0.50 phm. The use of a mercaptan in conjunction with an initiator comprising a persulphate is particularly advantageous because of the promoting effect of the mercaptan in addition to its molecular weight modifying effect.

It is also desirable to include an oxygen scavenger, such as sodium dithionite (sodium hydrosulphite), in amounts of e.g. 0.02 phm., since the presence of oxygen has an inhibiting effect on the polymerization reaction. Generally a small amount, e.g. 1 to 2 phm. of an electrolyte, such as anhydrous potassium carbonate, is also included in the reaction mixture in order to control the number of micelles in the initial stages of polymerization. This is more practical than reducing the amount of emulsifier used since this latter procedure can render the latex undesirably unstable.

The monomer-to-water ratio, or phase ratio, is desirably in the range (by weight) of 1:1.5 to 1:3, the ratio being adjusted as required to obtain optimum latex particle size at acceptable reaction rates.

The butadiene monomer may be emulsified in water using dispersing apparatus. We have found it very effective to use a separate vessel having a triple stage homogeniser connected in an external loop so that the contents of the vessel can be continuously cycled through the homogeniser before metering to a reactor. Alternatively the butadiene, water, emulsifier and other components of the reactor charge can be passed directly to the reactor through an in-line homogeniser. In either case very good emulsification of the butadiene is obtained.

The emulsion of monomer, initiator(s) and any other materials used in the reaction charge is then suitably passed to a pressure reactor, which may or may not be stirred. Conveniently for a continuous process, a tube reactor (such as a pipe) or a stirred pressure reactor is used. Preferably the reactor is thermally insulated such that at least a proportion of the heat of polymerization is retained in the reaction mixture. Heat may be supplied to the base of the reactor to raise the temperature of the reaction mixture to initiate polymerization. The initiation temperature is for example, 60° to 100° C. depending on the initiator(s) used. Once reaction begins, the temperature of the reaction mixture may be allowed to rise freely, preferably by retaining a proportion of the heat of polymerization in the reaction mixture.

In the case of reaction in a tube reactor, it is preferred that at least 80%, desirably substantially all, of the heat of polymerisation is retained in the reaction mixture so that a temperature increase of, for example 40 to 60° C. or more, is obtained. In this way the temperature of the mixture is generally in excess of 90° C., and more preferably in excess of 100° C., for at least half of the polymerization time (residence time), and the final temperature is in the range of e.g. 100° to 150° C. Thus conversions of monomer to polymer of 65 to 90% or more can be achieved in 3 to 5 hours. Conversions of at least 75% are readily obtained.

In the case of reaction in a stirred pressure reactor, it is preferred that the temperature of the reaction mixture does not rise above 100° C. More preferably the temperature of the reaction mixture is in the range 85° to 95° C. for at least half of the polymerization reaction time. Cooling of the reactor may be applied as desired in order to maintain the mixture at the required temperature. Conversions of monomer to polymer of 70% to 85% are readily obtained in 4 to 8 hours, typically 6½ hours.

When the desired conversion to polymer has been obtained in the reaction vessel, the latex mixture is generally passed to a pressure let-down vessel, since the pressure of the mixture during reaction rises to e.g. 300 to 400 p.s.i.g., and unreacted monomer is removed. Additional emulsifier, in amounts of e.g. 0.20 to 1 parts per 100 parts of polymer, may be added at this point, if desired, to adjust the latex stability. This may be especially necessary where the latex is to be used for further grafting. The latex is finally recovered at a solids content of 20 to 30% and may be removed from the pressure let-down vessel as required and is ready for use. If desired, a concentration stage may be used, it being readily possible to obtain a solids content of 50% or more without an agglomeration step.

Generally the number average particle size ($\bar{D}n$) of the polybutadiene latex obtained is 1500 A. or more, and preferably is in the range 2000 A. to 2800 A. The weight average particle size ($\bar{D}w$) of the latex obtained is at least 2500 A. Where the latex is to be used for grafting, as in the preparation of ABS, it is preferable that the number average particle size does not exceed 2400 and the weight average particle size does not exceed 3000. For optimum grafting it is preferred that the gel content of the polymer in the latex (determined by coagulation, dissolution in toluene for at least 24 hours at 20° C. and filtration through a 200 mesh gauze) be 60 to 90%, and the swelling index (as defined in U.K. Specification No. 965,851 and measured as defined therein except using toluene instead of benzene and a 200 mesh screen) be generally 10 to 30, desirably 12 to 20. Desirably the polybutadiene, after coagulation and drying, feels soft and rubbery and is not of a friable nature.

One particular application of importance for a polybutadiene latex prepared by the process of the invention is in grafting reactions for the preparation of reinforced thermoplastics using polybutadiene as the backbone polymer. The latex is particularly suitable for the preparation of acrylonitrile-butadiene-styrene copolymers (ABS).

Several methods are known for preparing graft copolymers which are, or may be used in, thermoplastics. One common method is to graft at least one of the monomer(s) which comprise the continuous phase of the thermoplastic onto rubber molecules existing in a latex. This method is particularly suitable for the preparation of a graft copolymer which comprises a rubbery backbone polymer (e.g. polybutadiene) with a vinyl aromatic monomer, (e.g. styrene) and/or unsaturated nitrile (e.g. acrylonitrile) grafted thereon. For example, the rubber latex may be grafted with monomer(s) capable of forming glassy thermoplastic homopolymer(s), e.g. those selected from a vinyl aromatic monomer such as styrene, alphamethyl styrene, methyl styrene or vinyl toluene, and/or an unsaturated nitrile monomer, such as acrylonitrile or methacrylonitrile, the ratios of the vinyl aromatic monomer to the unsaturated nitrile monomer and of both these monomers to the rubber being determined by the properties desired in the final graft copolymer. Thus in this procedure the monomer ratio is generally such that in the final thermoplastic there is present (a) 5 to 40%—typically 5 to 30%—of rubbery polymer, (b) 40 to 80% weight of vinyl aromatic monomer(s) units and (c) 15 to 25% by weight of unsaturated nitrile monomer(s) units. Preferably 10 to 25% by weight—typically 10 to 15%—of rubbery polymer is present, grafted with 65 to 75% of vinyl aromatic monomer(s) and 15 to 25% by weight of unsaturated nitrile monomer(s). As well as being present in the graft copolymer, some monomer units remain ungrafted in the form of a rigid matrix, the proportion present in this form being determined by, for example, the latex soap content.

As an alternative to this procedure e.g. 40 to 60% by weight (dry) of polybutadiene latex may be grafted with 60 to 40% by weight of monomer(s) selected from a vinyl aromatic monomer and/or an unsaturated monomer in such ratios to each other and to the rubber that the graft copolymer is generally still rubbery. Usually this graft copolymer is then blended further, generally either as a latex or as a powder, with a thermoplastic polymer, for example, one prepared from a vinyl aromatic monomer and/or unsaturated nitrile monomer, e.g. styrene/acrylonitrile (SAN), such that the composition of the polymer blend is as given above for the final thermoplastic. In either procedure, the monomer(s), e.g. styrene and acrylonitrile, are admixed with the latex and frequently allowed to soak or imbibe into the polymer over a period before beginning the grafting reaction.

The conditions under which the graft copolymer is prepared are those typically known in the art, e.g. using 0.1% to 1% by weight on monomers of a free radical initiator such as potassium persulphate or an activated hydro-peroxide or di-isopropylbenzene hydroperoxide, which may be activated thermally or using for example ferrous iron. After the grafting reaction the graft copolymer is recovered by e.g. precipitation.

Reinforced thermoplastics, such as ABS, prepared by grafting onto polybutadiene latices produced by the process of the present invention have a good balance of properties such as impact strength, hardness and melt flow and good appearance. Variation in the physical properties may be obtained by varying the monomer ratios used in the thermoplastic, for example by blending with glassy thermoplastics (e.g. SAN).

Some preferred embodiments of the process of the present invention will now be described by way of example.

In Examples 1 and 2, the apparatus shown in FIG. 1 of the accompanying drawings was used. Referring to this figure a mixing vessel 1, wherein initial emulsification of the monomer, supplied from source 2, takes place, is connected to a jacketed mild steel tube reactor 3 of approximate volume 25 gallon, of length 7 feet and diameter 10 inches, which is used for the polymerization reaction. Reactor 3, is connected to a pressure let-down vessel 4 and a recovery vessel 5. A Manto-Gaulin triple stage homogeniser 6 is connected in an external loop to the vessel 1 to enable good emulsification of the butadiene monomer to be obtained.

The reaction procedure used was as follows. Butadiene, and aqueous solutions of emulsifier(s) and initiator(s) supplied from sources 7 and 8 respectively were continuously metered into vessel 1 where the butadiene was emulsified by homogenisation and recycling around the external loop. The butadiene emulsion was continuously metered to reactor 3, the base of which was maintained at a temperature of approximately 80° C. The residence time in reactor 3 was approximately 3.5 hours and the maximum temperature was about 120° to 130° C. The polymer latex obtained in reactor 3 was passed to the pressure let-down vessel 4 where unreacted butadiene was removed, and any additional emulsifier required to adjust the latex stability was added from source 9. The polybutadiene latex was recovered in vessel 5.

Example 1

A polybutadiene latex was prepared using the following formulation.

| | Charge (phm.) |
|---|---|
| Butadiene | 100 |
| Water | 180 |
| Dresinate [1] 731 (70% active) | 1.0 |
| Dispersol [2] LR | 0.2 |
| Anhydros potassium carbonate | 1.15 |
| Sodium hydrosulphite | 0.02 |
| Initiator: | |
| Potassium Persulphate | 0.25 |
| Water | 15 |
| t-Dodecyl mercaptan | 0.2 |

[1] Dresinate 731 is the sodium salt of disproportionated rosin acid (Hercules Powder Co.)
[2] Dispersol LR is the sodium salt of a naphthalene—sulphonic acid—formaldehyde condensate (Imperial Chemical Industries Ltd.).

At the end of reaction a latex of solids content 28 to 32% was obtained with a percent conversion of 80 to 90%. The stability of the latex was adjusted by the addition of 0.75 p.h.r. of emulsifier.

The number average particle size ($\bar{D}n$) of this latex was 2085 A. and the weight average particle size ($\bar{D}w$) 2880 A. The gel content and swelling index, both measured as hereinbefore described, were 74% and 32 respectively.

Example 2

A polybutadiene latex was prepared using the following formulation.

| | Charge (phm.) |
|---|---|
| Butadiene | 100 |
| Oleic acid | 0.25 |
| Water | 100 |
| Potassium Hydroxide | [1] Ca 0.05 |
| Dispersol LR | [2] 0.7 |
| Anhydrous Potassium Carbonate | [2] 1.15 |
| Sodium Hydrosulphite | 0.02 |
| n-Dodecyl Mercaptan | [3] 0.10 |
| Initiator: | |
| Potassium Persulphate | 0.25 |
| Water | 94.7 |

[1] Sufficient potassium hydroxide was added to give a pH of 10.5 to 11.0.
[2] Added after formation of potassium oleate soap.
[3] Added direct to reaction vessel 1.

The maximum temperature attained in the polymerization reaction was in this case 100 to 110° C. and the conversion was 70 to 80% in 5 hours.

The number average particle size ($\bar{D}n$) of this latex was 1970 A. and the weight average particle size ($\bar{D}w$) 2850 A. The gel content and swelling index, both measured as described in this specification, were 90% and 13 respectively.

Samples of the polybutadiene latices from Examples 1 and 2 were used to prepare ABS samples by grafting 24 parts (dry) of latex (at 25% solids) with 50 parts of styrene and 26 parts of acrylonitrile using 2 parts (dry) of a 10% solution of Dresinate 731, 0.3 parts of t-dodecyl mercaptan and an initiator system of glucose (0.365 parts), ferrous sulphate (0.006 parts), sodium pyrophosphate (0.300 parts) and water (15.0 parts) with cumene hydroperoxide (0.6 parts of a 70% solution). In each case the ABS samples prepared had the following physical properties:

Notched impact strength (⅛″ bar. compression moulded) at 23° C.
ASTM D256–56 1961 _____ 8 to 9 ft. lbs.
Rockwell Hardness at 23° C.
(ASTM D785–65) _____ 94 to 96.
Melt Index (at 200° C./5 Kg.).
ASTM D1238–65T _____ 0.3 to 0.5 g./10 min.

Figure 2:
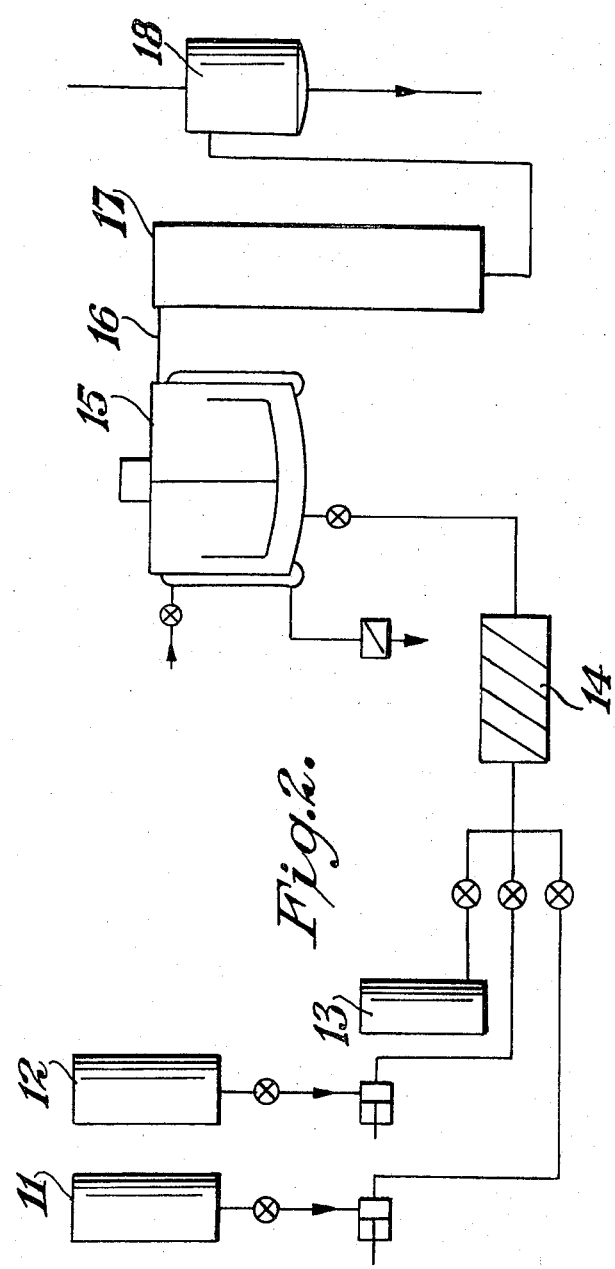

In the following Examples 3 to 5 the apparatus shown in FIG. 2 of the accompanying drawings was used. Referring to this figure, sources of emulsifier, 11, of initiator, 12, and of butadiene, 13, are connected to an in-line Manton-Gaulin triple stage homogeniser 14. The outlet of the homogeniser 14 is connected to the base of a stirred temperature-regulated pressure reactor 15. The top of the reactor has an outlet 16 connected to a pressure let-down vessel 17 which in turn connects with a recovery vessel 18.

The general reaction procedure used was as follows:

Butadiene and aqueous solutions of anionic emulsifier(s) and initiators(s) at 40° to 60° C. were continuously metered into the homogeniser 14 to obtain very good emulsification of the butadiene. The butadiene emulsion was passed to the reactor 15 maintained at a temperature of 85–95° C. The residence time in the reactor was approximately 6½ hours and the maximum temperature was 95° C. The polymer latex obtained in reactor 15 was passed to the pressure let-down vessel 17 and recovered in recovery vessel 18.

Examples 3 to 5

Polybutadiene latices were prepared using the formulations shown below:

| Example number | 3 | 4 | 5 |
|---|---|---|---|
| Butadiene | 100 | 100 | 100 |
| Potassium oleate | 0.16 | 0.25 | 0.25 |
| Bevaloid 35 [1] | 0.44 | 0.70 | 0.70 |
| Ammonium persulphate | 0.25 | 0.25 | 0.25 |
| n-Dodecylmercaptan | 0.30 | 0.30 | 0.30 |
| Potassium carbonate | 1.15 | 1.15 | 1.15 |
| Sodium hydrosulphite | 0.02 | 0.02 | 0.02 |
| Water | ~280 | ~280 | ~280 |
| Theoretical solids content (percent) | 27 | 27 | 27 |
| Maximum reactor temperature (° C.) | 90 | 100 | 100 |
| Conversion (percent) | 70–83 | 65–80 | 69–90 |
| $\bar{D}n$ (A.) | | 1,700–2,200 | |
| Gel content (percent) | [2] | 70–90 | 60–84 |
| Swelling index | | 9–18 | 14–21 |

[1] Bevaloid 35 is the sodium salt of a naphthalene-sulphonic acid-formaldehyde condensate.
[2] Not measured.

Samples of each polybutadiene latex were used to prepare ABS samples by grafting as described for Examples 1 and 2 except that 2 parts of a 10% solution of potassium oleate/linoleate emulsifier (in ratio 46:43) and 0.2 parts of a 10% solution of Bevaloid 35 were used in place of the Dresinate as emulsifier. The physical properties were measured as in Example 1 and were

| Example | 3 | 4 | 5 |
|---|---|---|---|
| Notched impact strength | 7–8.7 | 8.1 | 8.9 |
| Rockwell hardness | 81–90 | 86 | 83 |
| Melt flow | 0.2 | 0.15 | 0.10 |

What is claimed is:

1. A process for the preparation of a rubbery polybutadiene latex having particles of number average particle diameter ($\bar{D}n$) of at least 1500 A. and of weight average particle diameter ($\bar{D}w$) of at least 2500 A. characterised by the steps of
   (1) preparing an aqueous emulsion of butadiene containing 0.5 to 1.5 parts by weight per hundred parts of butadiene of an alkali metal salt anionic emulsifier and in addition, a thermally decomposable free radical initiator, to provide a reaction mixture,
   (2) initiating polymerization and allowing the polymerization to proceed under conditions such that the temperature of the reaction mixture is in excess of 85° C. for at least a part of the polymerization, and
   (3) recovering the latex formed.

2. A process according to Claim 1 in which the polymerization is carried out under continuous flow conditions.

3. A process according to Claim 1 wherein the amount of anionic emulsifier is 0.6 to 1.0 parts by weight per hundred parts of butadiene monomer.

4. A process according to Claim 1 wherein the anionic emulsifier is a mixture of a primary emulsifier and a secondary emulsifier.

5. A process according to Claim 4 wherein the primary emulsifier is the sodium or potassium salt of an organic carboxylic acid having 12 to 20 carbon atoms, or of rosin acid.

6. A process according to Claim 5 wherein the primary emulsifier is a sodium or potassium salt of palmitic acid, stearic acid, or an unsaturated fatty acid having 16 to 18 carbon atoms.

7. A process according to Claim 4 wherein the primary emulsifier is potassium oleate.

8. A process according to Claim 4 wherein the secondary emulsifier is an alkali metal salt of a naphthalene sulphonic acid derivative.

9. A process according to Claim 8 wherein the secondary emulsifier is the sodium salt of naphthalene-sulphonic acid-formaldehyde condensate.

10. A process according to Claim 4 wherein the secondary emulsifier is used in an amount of 0.3 to 1 parts by weight per hundred parts of butadiene.

11. A process according to Claim 4 wherein the weight ratio of the primary emulsifier to the secondary emulsifier is 5:1 to 1:5.

12. A process according to Claim 4 wherein the primary emulsifier is potassium oleate, the secondary emulsifier is the sodium salt of naphthalene-sulphonic acid-formaldehyde condensate, and the weight of primary emulsifier to secondary emulsifier is 1:2 to 1:3.

13. A process according to Claim 1 wherein the polymerization is carried out under conditions such that at least a proportion of the heat polymerization is retained in the reaction mixture.

14. A process according to Claim 1 wherein the temperature of the reaction mixture is in excess of 85° C. for at least half of the polymerization reaction time.

15. A process according to Claim 1 wherein the reactor is non-stirred and comprises a tube through which the reactants continuously flow.

16. A process according to Claim 15 wherein the tube is thermally insulated so that 50% or more of the heat of polymerization is retained in the reaction mixture.

17. A process according to Claim 16 wherein 80% or more of the heat of polymerization is retained in the reaction mixture.

18. A process according to Claim 15 wherein the reaction mixture is in excess of 100° C. for at least half of the polymerization reaction time.

19. A process according to Claim 15 wherein the temperature at the end of polymerization is 100 to 150° C.

20. A process according to Claim 15 wherein the butadiene is polymerized to a conversion of at least 65% in 3 to 5 hours.

21. A process according ot Claim 1 wherein the reactor is a stirred pressure reactor.

22. A process according to Claim 21 wherein the temperature of the reaction mixture does not exceed 100° C.

23. A process according to Claim 21 wherein the temperature of the reaction mixture is 85° C. to 95° C. for at least half of the polymerization time.

24. A process according to Claim 21 wherein the butadiene is polymerized to a conversion of 70% to 85% in 4 to 8 hours.

25. A process according to Claim 1 wherein a water-soluble, but not oil-soluble, initiator is used, and the initiation temperature is 60° to 100° C.

26. A process for the preparation of a rubbery polybutadiene latex having particles of number average particle diameter of at least 1500 A. and of weight average particle diameter of at least 2500 A. characterized by the steps of
   (1) preparing an aqueous emulsion of butadiene containing 0.6 to 1.0 part by weight per hundred parts (p.h.m.) of butadiene of an alkali metal salt anionic emulsifier, 0.1 to 0.40 p.h.m. of sodium, potassium or ammonium persulphate, and 0.03 to 0.50 p.h.m. of a mercaptan to provide a reaction mixture, (2) initiating polymerization and allowing the polymerization reaction to proceed in a stirred pressure reactor to a conversion of 70% to 85% in 4 to 8 hours under reaction conditions such that the temperature of the reaction mixture does not exceed 100° C. but is in excess of 85° C. for at least half of the polymerization reaction time, and (3) recovering the formed rubber latex at a solids content of 20 to 30% by weight.

27. A process according to Claim 1 wherein the free radical initiator is the sole catalyst.

28. A process according to Claim 1 wherein the aqueous emulsion prepared in (1) consists essentially of water, butadiene, alkali metal salt anionic emulsifier, a thermally decomposable free radical initiator, a mercaptan and an oxygen scavenger.

References Cited
UNITED STATES PATENTS

| | | | |
|---|---|---|---|
| 3,432,455 | 3/1969 | Rasicci | 260—82.1 |
| 3,025,286 | 5/1962 | Smith et al. | 260—94.4 |
| 3,168,507 | 2/1965 | Shryne | 260—94.4 |
| 3,196,143 | 7/1965 | Stewart et al. | 260—94.4 |

ALLAN LIEBERMAN, Primary Examiner

T. DeBENEDICTIS, Sr., Assistant Examiner

U.S. Cl. X.R.

260—29.7 SE, 82.1, 94.4, 95 C